April 14, 1970   N. D. FRIEDBERG ET AL   3,506,538
APPARATUS FOR PRODUCING A HOMOGENEOUS FOAM
Filed Dec. 21, 1966   2 Sheets-Sheet 1

INVENTORS
Norman D. Friedberg
James P. Hutchins
BY
*Fredrick H. Braun*
ATTORNEY

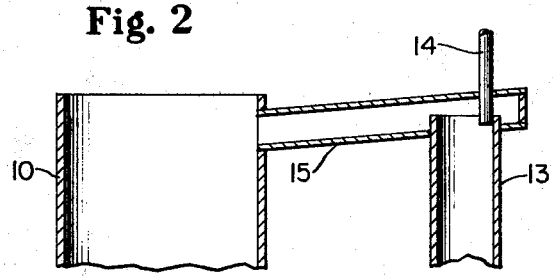
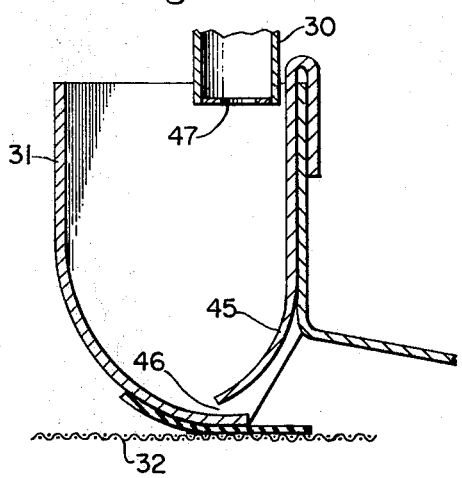
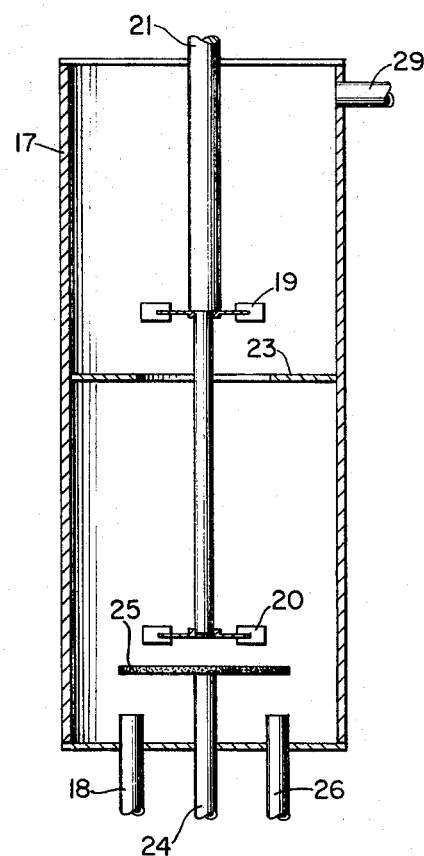
INVENTORS
Norman D. Friedberg
James P. Hutchins
BY
ATTORNEY

United States Patent Office 3,506,538
Patented Apr. 14, 1970

3,506,538
APPARATUS FOR PRODUCING A HOMOGENEOUS FOAM
Norman D. Friedberg, Cincinnati, and James P. Hutchins, Springfield Township, Hamilton County, Ohio, assignors to The Procter & Gamble Company, Cincinnati, Ohio, a corporation of Ohio
Filed Dec. 21, 1966, Ser. No. 603,548
Int. Cl. D21f 1/02
U.S. Cl. 162—341        4 Claims

ABSTRACT OF THE DISCLOSURE

An apparatus is disclosed for producing a homogeneous stable foam from a fibrous slurry and thereafter depositing the foam on the moving wire of a fourdrinier. The apparatus includes a slurry feed tank and means for continuously recirculating the slurry. A fraction of the recirculating slurry is continuously introduced in a foaming vessel. Air is beat into the slurry to produce a fine bubbled homogeneous foam. The foam is continuously deposited in a metering trough by means of an oscillating nozzle located over the moving wire of a fourdrinier.

---

The present invention is particularly suited for making a homogeneous stable wet foam having cellulosic fibers uniformly dispersed therein. The foam can be dried very effectively to produce an absorbent, low density fibrous sponge-like batt material by the drying method described and claimed in the copending application of Norman D. Friedberg and Frank S. Adams, Ser. No. 625,367, filed Mar. 23, 1967, which application is entitled Method For Drying a Wet Foam Containing Cellulosic Fibers.

The nature and substance of the invention can be summarized briefly as comprising an apparatus for producing a homogeneous foam from a fibrous slurry, including means for recirculating the fibrous slurry and means for withdrawing a fraction of the recirculated slurry and introducing same to a foaming device which can be in the form of a vessel having rotatable beater blades therein. A metering trough is mounted transversely over the moving wire of a fourdrinier. An oscillating nozzle is mounted over the metering trough and is continually reciprocated as it discharges foam from the foaming device to maintain a substantially constant head of foam throughout the length of the metering trough. The wet foam is discharged from the metering trough, through a slice, whereupon it is deposited on the moving wire with a substantially uniform basis weight.

While the specification concludes with claims particularly pointing out and distinctly claiming the subject matter regarded as forming the present invention, it is believed the invention will be better understood from the following description taken in connection with the accompanying drawings in which:

FIGURE 2 is a fragmentary elevation in cross section taken on the line 2—2 of FIGURE 1 showing portions of the recirculating means for the feed tank and the slurry withdrawal pipe.

FIGURE 3 is a fragmentary elevation in cross section taken on the line 3—3 of FIGURE 1 showing the interior structure of the foaming vessel.

FIGURE 4 is a fragmentary elevation in cross section taken on the line 4—4 of FIGURE 1 showing the structure of the metering trough and the adjustable splash plate.

Figure 1:
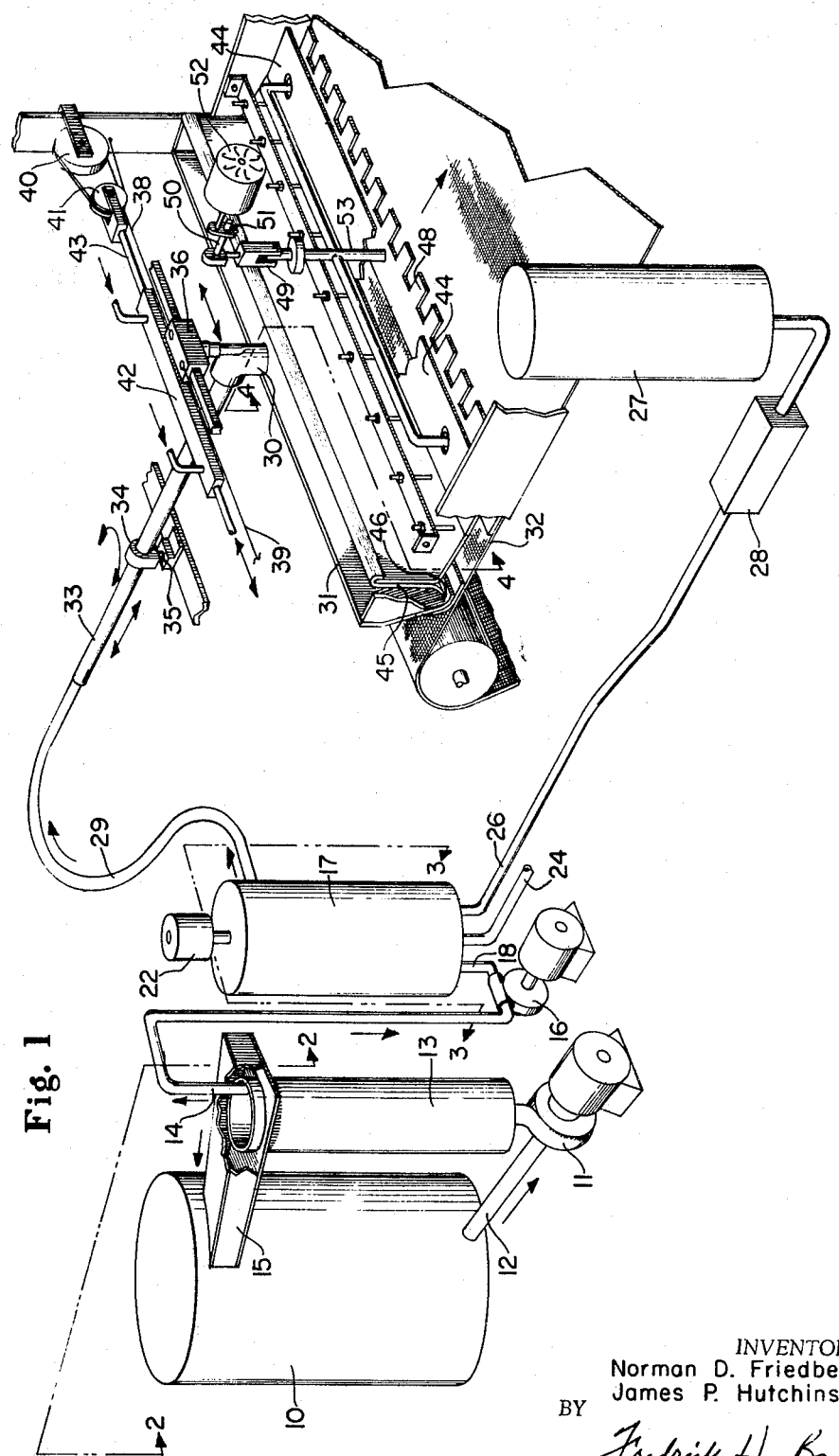
FIGURE 1 is a fragmentary perspective view showing the various components of the apparatus.

Referring now to FIGURE 1, the several components of the invention will now be described in greater detail.

A fiber slurry containing cellulosic fibers, a portion of which may include synthetic fibers in a liquid media, for example water, is initially introduced in the feed tank 10. The slurry can range from about 1% to about 6%, but preferably is in the range of from about 3% to about 5% by weight of cellulose fibers. The slurry is continuously recirculated and agitated by means of the pump 11 which withdraws the slurry through the pipe 12 and passes it into the vertical standpipe 13. A small fraction of the slurry is continuously withdrawn through the pipe 14 and the remainder is returned to the tank 10 by way of the recycle return passage 15. Continuous recirculation of the slurry by means of the pump 11 causes the fibrous material to be substantially uniformly dispersed in the slurry which is most desirable in continuously producing a wet foam of uniform density.

It will be noted in FIGURE 2 that the axis of the withdrawal pipe 14 is substantially parallel to the sidewall of standpipe and to the flow direction in the standpipe 13. In addition, the withdrawal pipe 14 is located between the center line of the standpipe 13 and its side wall. This particular location has been found preferable when continuously withdrawing a fraction of the slurry in which fiber distribution is substantially uniform. It has also been found that best results are obtained when the level in the feed tank is maintained within about 20% of its initial level which preferably is about three-quarters full. This latter objective is accomplished by continuously adding slurry to the feed tank 10 by well known and conventional means (not shown).

The pump 16 is used to move the slurry from the withdrawal pipe 14 and pass it into the foaming means or vessel 17. As shown in FIGURE 3, the slurry is introduced to the vessel 17 through the inlet conduit 18. The slurry is whipped and agitated in the two stage foaming vessel 17 by means of the beater blades which are shown as two sets 19 and 20 mounted on the common shaft 21 and driven by the motor 22 (FIGURE 1). A baffle 23 is mounted intermediate to the beater blade sets to separate the foaming vessel into two stages, although any number of stages can be used in the foaming vessel. The sets of blades 19 and 20 are preferably flat and mounted radially with respect to the supporting shaft 21. The flat blade design produces a pumping action in the vessel 17 which is highly desirable in combination with the shearing action provided by the rotating blades.

Air is introduced by means of the air inlet conduit 24 which passes the air through an air distributor 25 which may be a foraminous plate in order to obtain dispersion of fine air bubbles in the slurry. A small amount of a compatible surfactant material is introduced as a foaming agent through the conduit 26 from the storage tank 27 by means of the pump 28. As the shaft 21 is rotated, the beater blades whip air into the mixture containing the fibrous slurry and the surfactant to form a creamy fine bubbled homogeneous foam.

A suitable foam is generated in the vessel 17 after a minimum nominal residence time of 20 seconds. The foam may be as much as 7 times the original volume of the slurry, but preferably is about 3½ times the original volume of the slurry. The foam is withdrawn through the flexible outlet conduit 29 and discharged from an oscillating nozzle 30, which is supported over the metering trough 31. The metering trough 31 lies transversely across the moving wire 32 of a fourdrinier. The oscillating nozzle 30 is attached to the flexible conduit 29 by means of the rigid conduit 33 which slides through the bearing block 34, the latter being pivoted at 35 in order to permit lateral oscillation of the nozzle 30.

A mechanism is provided for moving the nozzle 30 through its oscillating path. This mechanism or means includes a carriage 36 to which the nozzle 30 is attached. The carriage 36 is moved in reciprocating fashion by means of the cables 38 and 39, the former being carried over the pulleys 40 and 41, where as the latter passes over and around a similar mechanism (not shown). A double acting hydraulic cylinder 42 is provided to reciprocate the rod 43.

The oscillating nozzle 30 is moved laterally back and forth over the metering trough in response to the reciprocating movement of the rod 43 such that the foam material is deposited in the trough and maintained therein with a substantially constant head of about 2″ to about 6″ above the level of foam being carried forward on the wire 32. A vertically adjustable slice 44, preferably a thin flexible metal sheet, is provided to control the foam level (thickness) deposited on the wire 32. The slice opening (the vertical distance between the wire 32 and the slice 44) can be adjusted to a variable degree across the width of the slice so that the thickness of the foam can be made completely uniform throughout its width.

The metering trough 31 includes an adjustable splash plate 45 (see FIGURES 1 and 4). The splash plate 45 can be moved vertically and set as desired to control the width of the outlet opening 46. The splash plate 45 also functions to absorb the force or shock of the foam deposited from the opening 47 in the nozzle 30 to prevent the shock from disturbing the deposition of foam on the wire 32. By adjusting the position of the splash plate 45, the width of the opening 46 can be controlled to permit the desired buildup of foam head in the metering trough. The presence of a head of foam is desirable to prevent hose oscillation patterns from appearing in the final dried structure of the sponge-like batt material and for aiding in leveling of the foam in the cross direction which is necessary for uniform basis weight.

Because of the flow characteristics in the apparatus, the cellulosic fibers in the foamed slurry will be substantially directionally oriented when deposited on the wire 32. This may be desired in some instances in which case no additional treatment of the foam is needed. In the event a more random fiber orientation is desired, however, an additional mechanism can be provided to achieve such a foam structure.

As shown in FIGURE 1, the mechanism for obtaining a more random fiber orientation includes a flat blade 48 mounted for vertical reciprocation between the wire 32 and the slice 44 by means of the support member or means 53, the connecting member 49, the drive member 50, and the eccentric 51 driven by the motor 52. As illustrated, the flat blade 48 has a saw tooth design, this being satisfactory although not necessarily essential. By reciprocating the blade perpendicular to the flow in the slice with an amplitude of at least about 75% of the slice opening, the most uniform foam structure having the most isotropic properties will be reproduced. Typically, the blade 48 is reciprocated at a rate of between 1 and 3 oscillations per second. A slower rate will not accomplish the desired results and a faster rate will tend to harm the foam structure.

The fibrous foams employed and generated in the apparatus of this invention can also be of the type described in Bryant's U.S. Patent 1,740,280 or in copending application Ser. No. 319,777, now Patent No. 3,311,115, filed by Mueller et al., on Oct. 29, 1963. Those disclosures are incorporated herein by reference. They also suggest several uses to which the fibrous foams can be put.

While particular embodiments of the invention have been illustrated and described, it will be obvious to those skilled in the art that various changes and modifications can be made without departing from the spirit and scope of the invention and it is intended to cover all such changes and modifications that are within the scope of this invention.

What is claimed as new is:

1. Apparatus for producing a stable foam having cellulose fibers dispersed therein and thereafter depositing said foam in a metering trough comprising a feed tank and a standpipe, a return passage connected between said feed tank and said standpipe, means for recycling a fibrous slurry between said feed tank and said standpipe to maintain a uniform slurry consistency, means for withdrawing a fraction of the fibrous slurry from said standpipe and introducing said fraction into a foaming means, said foaming means including a foaming vessel having at least one set of beater blades suspended for rotation therein, inlet means for introducing air into said foaming vessel, said inlet means connected to an air distributor in said foaming vessel, a surfactant storage tank, means for introducing a small quantity of surfactant from said surfactant storage tank into said foaming vessel, a conduit for delivering foam from said foaming vessel to a nozzle, said nozzle being mounted over a metering trough, said metering trough being mounted transversely over a moving fourdrinier wire, said metering trough having an outlet opening, and means including a carriage to support said nozzle for causing oscillating movement of said nozzle transversely over said metering trough to maintain a substantially constant head of foam therein.

2. Apparatus as claimed in claim 1 including a slice at said outlet opening of said metering trough for controlling the foam thickness deposited on the moving fourdrinier wire, a flat blade extending longitudinally in the slice, means for supporting said flat blade, means connected to said supporting means for reciprocating said flat blade substantially perpendicular to the fourdrinier wire to obtain more random and uniform fiber orientation of the foam deposited on the fourdrinier wire.

3. Apparatus as claimed in claim 1 wherein said standpipe includes a side wall, and said withdrawing means includes a withdrawal pipe projecting into said standpipe with its axis substantially parallel to the standpipe side wall.

4. Apparatus as claimed in claim 2 wherein said standpipe includes a side wall, and said withdrawing means includes a withdrawal pipe projecting into said standpipe with its axis substantially parallel to the standpipe side wall.

References Cited

UNITED STATES PATENTS 1,740,280  12/1929  Bryant _____ 162—101
1,841,785   1/1932  Bryant _____ 162—101

S. LEON BASHORE, Primary Examiner

R. H. TUSHIN, Assistant Examiner

U.S. Cl. X.R.

162—209, 216, 313, 344